No. 699,495. Patented May 6, 1902.
F. W. DALLINGER.
APPARATUS FOR MAKING COFFEE, &c.
(Application filed Mar. 14, 1901.)
(No Model.)
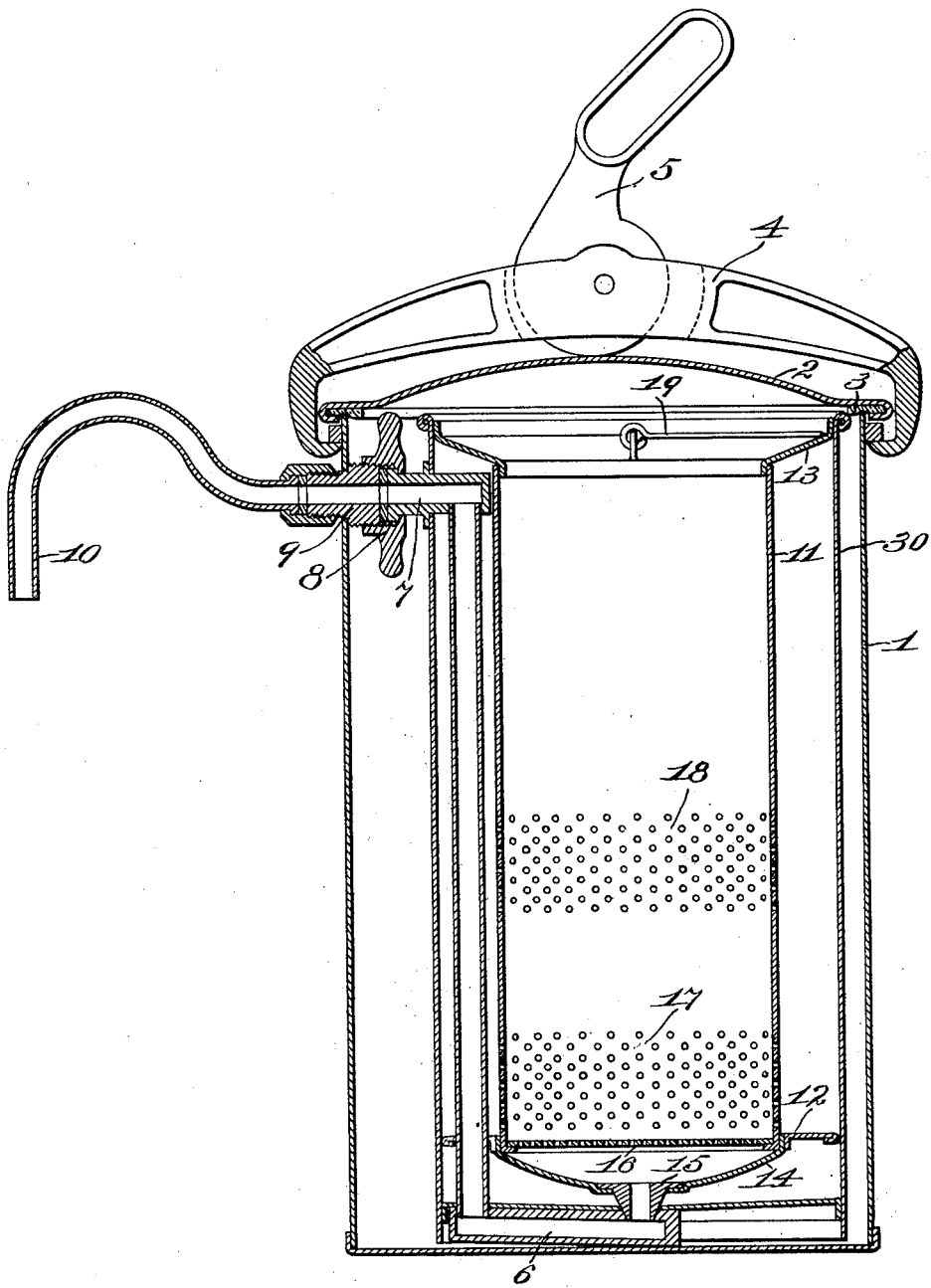
WITNESSES
Edward S. Day
Horace Van Everen
INVENTOR
Frank W. Dallinger
by his Attorney
Benjamin Phelps

UNITED STATES PATENT OFFICE.

FRANK W. DALLINGER, OF CAMBRIDGE, MASSACHUSETTS.

APPARATUS FOR MAKING COFFEE, &c.

SPECIFICATION forming part of Letters Patent No. 699,495, dated May 6, 1902.

Application filed March 14, 1901. Serial No. 51,041. (No model.)

*To all whom it may concern:*

Be it known that I, FRANK W. DALLINGER, a citizen of the United States, residing at Cambridge, in the county of Middlesex and State of Massachusetts, have invented certain new and useful Improvements in Apparatus for Making Coffee and the Like; and I do hereby declare the following to be a full, clear, and exact description of the invention, such as will enable others skilled in the art to which it appertains to make and use the same.

The present invention relates to an improved apparatus for making coffee or the like.

The object of my invention is to produce an improved apparatus for making coffee or the like in which the coffee is quickly made by passing the hot water through the coffee-grounds two or more times and in the provision whereby superheating of the water and long-continued application of heat is prevented, thus obtaining a decoction from the coffee free from all tannic acid or other ill-tasting juices. To the above end the present invention consists in the improved apparatus for making coffee or the like hereinafter described and claimed.

The accompanying drawing, illustrating the preferred form of my invention, is a sectional elevation.

The steam-chamber 1 is provided with a lid 2, carrying a rubber gasket 3, so that the steam-chamber 1 may be hermetically closed thereby, a clamp 4 and eccentric lever 5 being employed to hold the lid 2 on the chamber 1. Within the steam-chamber 1 is contained an open decoction-chamber 30, which consists of a cylindrical vessel provided with an outlet at its bottom extending up to near the top of the steam-chamber and out through the side of the latter. The outlet is constructed as follows: A pipe 6 leads from the bottom of the decoction-chamber, extending along the bottom, up inside of the chamber, and out through a connection 7, provided with a threaded sleeve 8, adapted to be screwed onto the connection 9, secured in the wall of the steam-chamber opposite thereto, thence out through the discharge-pipe 10. The threaded sleeve 8 permits the connection 7 to be disconnected from the connection 9, so that the decoction-chamber may be removed from the steam-chamber for purposes of cleansing. Inside of the decoction-chamber is a coffee-holder 11, which is preferably designed to have about one-half the cubical capacity of the decoction-chamber, its side walls being cylindrical and equidistant from the walls of the decoction-chamber. It is provided at its bottom with a distance-flange 12 and at its top with a conical flange 13, which flanges loosely engage the inside of the decoction-chamber and support said coffee-holder in proper position in the decoction-chamber. It is to be noted that the flange 13 merely affords a support for the coffee-holder in the decoction-chamber and is not capable of preventing the passage of steam or air therethrough in the operation of the apparatus, as hereinafter set forth, and as a consequence that the decoction-chamber and the steam-chamber are always in direct communication with each other. The bottom 14 of the coffee-holder is provided with a nozzle 15, which fits within a correspondingly-shaped hole in the bottom of the decoction-chamber which leads to the pipe 6. The coffee-holder is provided with a false bottom 16 of perforated sheet metal, and the sides of the coffee-holder are provided with bands of perforations, the first band 17 extending from the bottom of the holder upward about one-sixth ($\frac{1}{6}$) of its height and the second band 18 beginning at a point about one-sixth ($\frac{1}{6}$) of the height of the holder above the first band and being about the same width as the first band. The holder is provided with a bail 19, by which it may be lifted from the decoction-chamber.

The operation of my improved apparatus for making coffee or the like is as follows: Let it be assumed that the capacity of the apparatus is two gallons. A quart of boiling water is poured into the steam-chamber. A pound of finely-ground (preferably not powdered) coffee is put in the coffee-holder. The height of the dry coffee in the holder should be about even with the top of the upper band of perforations therein. Eight quarts of boiling water are now poured slowly into the coffee-holder. The wetting of the coffee swells it, and it rises with the inflow of water and is suspended loosely in the water, so that the coffee extends pretty well up toward the top of the coffee-holder. The water poured in passes through the coffee in the coffee-holder, out through the bands of perforations 17 and 18 into the annular space between the coffee-holder and the decoction-chamber, and fills both the coffee-holder and the decoction-chamber nearly to the top of the latter. It will thus be seen that most of the water has passed entirely through the coffee once. It is immaterial if all of the water does not pass entirely through all of the coffee at this time, the object being to have substantially all of the water passed through the coffee at this time. I am not able exactly to state how the relative positions of the bands of perforations operate; but experiment has conclusively demonstrated to me that this arrangement of perforations is more satisfactory in operation than any other arrangement. I believe the absence of perforations between the two bands conduces to the flow of the water through the lower bands of perforations and provides sufficient pressure of water to force the water into the lower part of the coffee and out through the lower band of perforations, whereas if the perforations were contained in a single continuous band the water would escape through the upper perforations without affording sufficient pressure to penetrate the coffee opposite the lower part of the perforations. I believe the absence of perforations above the upper band of perforations causes most of the water to flow through the upper band of perforations into the decoction-chamber, whence it subsequently passes in through the lower band of perforations and again through the grounds in the discharging operation. Then the lid is put on the steam-chamber and fastened by the yoke and clamp, and heat is applied to the bottom of the steam-chamber, whereby steam is generated in the steam-chamber. This steam presses upon the liquor in the decoction-chamber, and when it rises to a sufficient pressure it will force the water both from the outside and from the inside of the coffee-holder, again down through the coffee in the coffee-holder and out through the pipe 6, and discharge it into a vessel provided to receive it. It is to be noted that in the operation of my apparatus the only communication between the decoction-chamber and the pipe 6 is through the coffee-holder. At this time, therefore, the water is a second time forced through the coffee and without excessive or long-continued heating of the decoction in the presence of the coffee-grounds. These two passages of the water through the coffee extract in a short time all the excellent qualities of the coffee and produce a coffee of a strength greater than that which would be secured by ordinary means. I have demonstrated that with the same quantity of ground coffee I can produce a decoction of equal strength with that usually produced by the percolation process of making coffee in a small fraction of the time ordinarily required for that purpose.

It is immaterial to my invention what size or capacity of vessel is used or what means of heating is employed. It will be understood that the principal features of my invention are that the coffee is made with extreme expedition, that the coffee produced in a given length of time is stronger in proportion to the quantity of ground coffee employed than any process known to me, and that the coffee is purer, extracting caffein without releasing the tannic acid.

While I have described my invention as an apparatus for making coffee, it is to be understood that it is by no means specifically limited thereto, as the same may be employed in making various kinds of decoctions from herbs or the like; nor is my invention limited to the particular form of apparatus employed except where in the claims I have so specifically limited it thereto, as my invention in its broader aspects contemplates any equivalent form of apparatus for making a decoction of vegetables.

Having thus described my invention, I claim as new and desire to secure by Letters Patent of the United States—

1. An apparatus for making coffee or the like, having, in combination, a closed steam-chamber, a decoction-chamber in said steam-chamber, and a coffee-holder within the decoction-chamber, said coffee-holder being provided with a pipe leading from its bottom upward and out through the side of the steam-chamber near its top, said decoction-chamber being in communication with said steam-chamber and coffee-holder, substantially as described.

2. An apparatus for making coffee or the like, having, in combination, a closed steam-chamber, a decoction-chamber in said steam-chamber, and a coffee-holder within the decoction-chamber provided with a pipe leading from its bottom, said decoction-chamber being in communication with said steam-chamber and coffee-holder, substantially as described.

3. An apparatus for making coffee or the like, having, in combination, a steam-chamber, a decoction-chamber, a coffee-holder in said decoction-chamber provided at or near its bottom with perforations communicating with the decoction-chamber and provided with a pipe leading from its bottom, substantially as described.

4. An apparatus for making coffee or the like, having, in combination, a closed steam-chamber, a decoction-chamber in said steam-chamber, a coffee-holder within the decoction-chamber provided with a pipe leading from its bottom upward and out through the side of the steam-chamber near its top, substantially as described.

5. An apparatus for making coffee or the like, having, in combination, a closed steam-chamber and a decoction-chamber in said steam-chamber having communication with the steam-chamber above the levels of the liquids adapted to be contained in both chambers, substantially as described.

6. An apparatus for making coffee or the like, having, in combination, a closed steam-chamber, a decoction-chamber in said steam-chamber having communication with the steam-chamber above the levels of the liquids adapted to be contained in both chambers, and a coffee-holder in and having communication with said decoction-chamber, substantially as described.

7. An apparatus for making coffee or the like, having, in combination, a closed steam-chamber, a decoction-chamber in said steam-chamber having pressure communication with said steam-chamber, and provided with an outlet through the steam-chamber for the discharge of the decoction, and a coffee-holder in and having communication with said decoction-chamber, substantially as described.

8. An apparatus for making coffee or the like, having, in combination, a closed steam-chamber, a decoction-chamber in said steam-chamber, a coffee-holder in and having communication with the decoction-chamber and a pipe passing through the decoction-chamber, leading from the bottom of the coffee-holder upward and out through the side of the steam-chamber, substantially as described.

9. An apparatus for making coffee or the like, having, in combination, a decoction-chamber, a coffee-holder in said decoction-chamber provided near its bottom with separated bands of perforations affording the only means of communication for liquids between the coffee-holder and the decoction-chamber, substantially as described.

In testimony whereof I affix my signature in presence of two witnesses.

FRANK W. DALLINGER.

Witnesses:
ALFRED H. HILDRETH,
HORACE VAN EVEREN.